May 22, 1934.  W. J. MADDEN  1,959,633
SPACING MEMBER FOR MULTIPLE DUCTS
Filed March 19, 1932   2 Sheets-Sheet 2
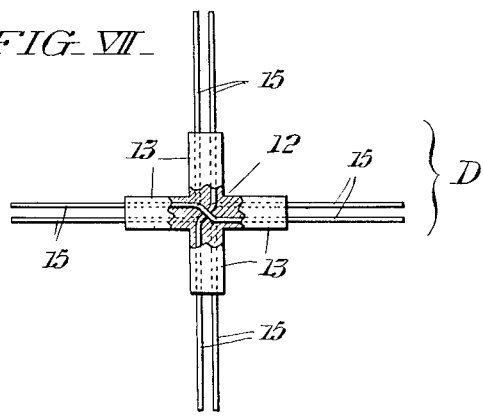
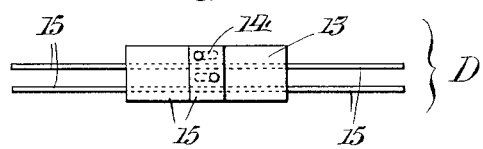
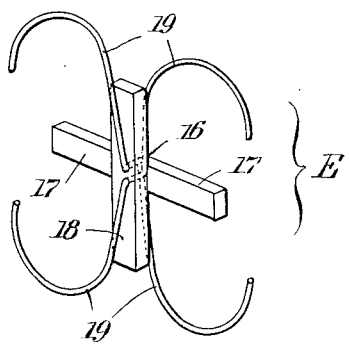
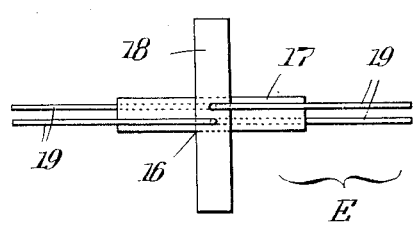
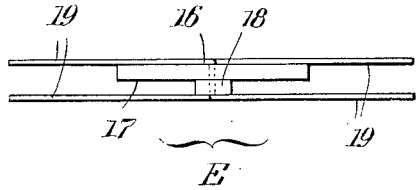
WITNESSES:
Hubert Fuchs
William Bell, Jr.
INVENTOR:
William J. Madden,
BY Fraley Paul
ATTORNEYS.

Patented May 22, 1934

1,959,633

UNITED STATES PATENT OFFICE 1,959,633

SPACING MEMBER FOR MULTIPLE DUCTS

William J. Madden, Lansdowne, Pa.

Application March 19, 1932, Serial No. 600,001

7 Claims. (Cl. 247—34)

This invention relates to multiple ducts, and more particularly to fastening members useful in assembling multiple ducts and serving to support such ducts in spaced parallel relation.

Heretofore it has been proposed to support a number of ducts with their axes in spaced parallel relation by means of collars suitably joined together and each adapted to surround one duct unit of a group. Such a device necessitates that the ducts or sections thereof be guided in the direction of their length through the collars, and this may be a difficult or laborious operation, especially where a limited space is available and the duct units are relatively long.

The principal object of the present invention is to provide a simple and economical article of manufacture adapted to maintain multiple duct units in the desired spaced relation, and to secure them to each other by pliant projections or members which are bent around the duct units after they have been placed in the desired positions in which they are to be mounted, thus facilitating the installation of a duct system.

Other objects and advantages characterizing my invention will become more fully apparent from the description hereinafter of several examples or embodiments thereof having reference to the accompanying drawings. Of the drawings:

Fig. I represents a perspective view of a group of four ducts assembled according to the practice of my invention.

Fig. II represents a perspective view of the spacing member shown in Fig. I before its application to a group of ducts.

Fig. III represents a perspective view of a modified form of spacing member consisting of a single piece of metal.

Fig. IV represents a perspective view showing the reverse side of the spacing member of Fig. III.

Fig. V represents a perspective view of another form of spacing member in which round rods are employed.

Fig. VI represents a plan view of the spacing member of Fig. V before the rods have been bent.

Fig. VII represents a side elevation of another form of spacing member generally similar to that of Fig. V, with certain portions of the central support broken away to illustrate the manner in which the rods are embedded in the central support.

Fig. VIII represents a plan view of the spacing member of Fig. VII.

Fig. IX represents a perspective view of another form of spacing member comprising two supporting elements joined together by diagonal rods.

Fig. X is a side elevation showing the reverse side of the same before the rods have been bent; and, Fig. XI is a plan view of the same.

In Fig. I of the drawings there are shown four ducts or tubular conduits 1 arranged in parallel spaced relation with their axes equi-distant from a common point, and fastened together and supported by a spacing member A. In Fig. II the spacing member A is shown in perspective in its normal shape before application to duct units. It comprises a support consisting of channel sections 2 disposed at right angles to each other and affording radially extending arms for the spacing and supporting of duct units. The intersecting channel sections 2 are placed back to back and locked together by means of a lug or tab 3 on one section passing through an opening 4 in the other section and bent over to hold the parts securely together. Each channel section 2 has integral therewith straps in the form of flat bands 5 constituting continuations of the flanges of the channel section and normally extending in parallel planes. The bands 5 are sufficiently pliant as to be adapted to be readily bent around the ducts when they are assembled as shown in Fig. I. It will be apparent that the flat bands 5 are aligned with the central support so as to engage the duct units 1 tangentially. Moreover, the bands 5 serve to fasten the duct units 1 to each other as well as to the central support.

In Figs. III and IV there is shown a somewhat similar spacing member B comprising a single piece of metal having a central support 6. From the radially extending arms 7 of the central support 6, aligned straps in the form of flat bands 8 project outward and are adapted to engage the duct units tangentially. The straps 8 are sufficiently pliant to be readily bent to the curved form shown in Fig. III.

In Figs. V and VI there is shown a spacing member C comprising a central support 9 having arms 10 extending radially from the center of the support. The support 9 may consist of wood, fibre, concrete or other similar material, and it is hollowed to permit the insertion of metal rods 11 or molded about such metal rods. The metal rods 11 normally project outward in substantial alignment with the edges of the arms 10, and their ends are adapted to be bent around the duct units to the curved shape shown in Fig. V. The metal rods 11, as shown in Fig. VI, are normally straight throughout and cross each other at right angles within the central support 9.

In Figs. VII and VIII there is shown another form of spacing member D comprising a central support 12 having radially extending arms 13. In this example the central support 12 is preferably made of concrete and is hollowed as indicated at 14 to accommodate metal rods 15. The rods 15 are embedded in the support 12 in such manner as to increase its strength. They cross each other diagonally at the center of the support. The ends of the rods 15 extend outward in substantial alignment with the edges of the arms 13, and they are adapted to be bent to curved form to surround partially the exterior surfaces of four ducts.

In Figs. IX, X and XI there is shown a spacing member E, comprising a central support 16. The central support 16 consists of two flat members 17 and 18 disposed at right angles and secured together by rods 19. The rods 19 pass through the contiguous areas of the members 17 and 18 and cross each other diagonally. Their ends are adapted to be bent to curved form as shown in Fig. IX, whereas their intermediate portions serve to secure the members 17 and 18 together by passing through apertures from one side of the two-piece support to the other. When the spacing member E is used for the assembly of multiple ducts, the ducts are secured to each other and to the support 16 by bending over the ends of the rods 19 so that one rod secures one diagonal pair of ducts and the other rod secures the other diagonal pair of ducts.

In all of the forms of spacing members above described, the pliant straps, whether they consist of flat bands or of round rods, are substantially aligned by a central supporting member and are caused to engage the ducts tangentially. In each example the central support is adapted to accommodate ducts of varying diameters and to serve as a spacing device. Moreover, the straps are in each example of pliant material adapted when bent to hold their new shape so as to serve effectively as fastening members.

In assembling multiple ducts, such as the group of four shown in Fig. I, the ducts are first placed between the radial arms of the central support; and when their positions are thus determined, they are secured in place by bending over the projecting straps.

While I have described several examples of the practice of my invention, it will be readily apparent that the spacing members contemplated by this invention may assume other forms than the examples which are herein illustrated; that the flexible straps may be of round, flat or other cross section; and that the spacing member may obviously be varied to accommodate any desired number of ducts, all without departing from the spirit of the invention as defined in the annexed claims.

Having thus described my invention, I claim:

1. A multiple duct section comprising a plurality of duct units, and means for holding said duct units together, said means comprising a central support in the form of arms projecting radially from a common point of intersection, the arms being relatively stiff and serving to space the duct units in predetermined relation, and straps projecting outward from the ends of said arms and bent around the duct units to secure them to the support, said straps being sufficiently pliant to permit their being readily bent to the contour of the duct units, and each said strap being affixed to the central portion of the support and extending continuously from the surface of one duct unit through the central portion of the support to the surface of another duct unit.

2. A multiple duct section comprising a plurality of duct units, and means for holding said duct units together, said means comprising a central support in the form of arms projecting radially from a common point of intersection, the arms being relatively stiff and having side edges serving to space the duct units in predetermined relation, and straps projecting outward from the ends of said arms so as to form continuations of their side edges and bent around the duct units to secure them to the support, said straps being sufficiently pliant to permit their being readily bent to the contour of the duct units, and each said strap being affixed to the central portion of the support and extending continuously from the surface of one duct unit through the central portion of the support to the surface of another duct unit.

3. A multiple duct section comprising a plurality of duct units, and means at intervals therealong for holding said duct units together, each said means comprising a central support in the form of arms projecting radially from a common point of intersection, the arms being relatively stiff, and serving to space the duct units in parallel relation with the axes equi-distant from said common point of intersection, and straps projecting outward from the ends of said arms and bent around the duct units to secure them to the support, said strap being sufficiently pliant to permit their being readily bent to the contour of the duct units, and each said strap being affixed to the central portion of the support and extending continuously from the surface of one duct unit through the central portion of the support to the surface of another duct unit.

4. A multiple duct section comprising a plurality of duct units, and means for holding said duct units together, said means comprising intersecting channel sections serving to space the duct units in predetermined relation and pliant straps constituting continuations of the flanges of said channel sections and bent around the duct units to secure them to the support.

5. A multiple duct section comprising a plurality of duct units, and means for holding said duct units together, said means comprising a support in the form of hollowed arms radially projecting from a central point, the arms being relatively stiff and serving to space the duct units in predetermined relation, and pliant straps crossing each other within said support and having their ends projecting outward from said arms and bent around the duct units to secure them to the support.

6. A multiple duct section comprising a plurality of duct units, and means for holding said duct units together, said means comprising a support in the form of hollowed arms radially projecting from a central point, the arms being relatively stiff and serving to space the duct units in predetermined relation, and pairs of pliant straps disposed within each said arm, said straps crossing each other and having their ends bent oppositely as to pairs around the duct units to secure them to the support.

7. A multiple duct section comprising a plurality of duct units, and means for holding said duct units together, said means comprising two identical members joined at right angles to form a spacing support for the duct units, and rods for securing said members together, one of said rods having its ends bent to curved shape and extending from said support to secure a diagonal pair of duct units thereto, and the other rod having its ends similarly shaped and extending from said support to secure the other diagonal pair of duct units thereto.

WILLIAM J. MADDEN.